Patented Jan. 7, 1941

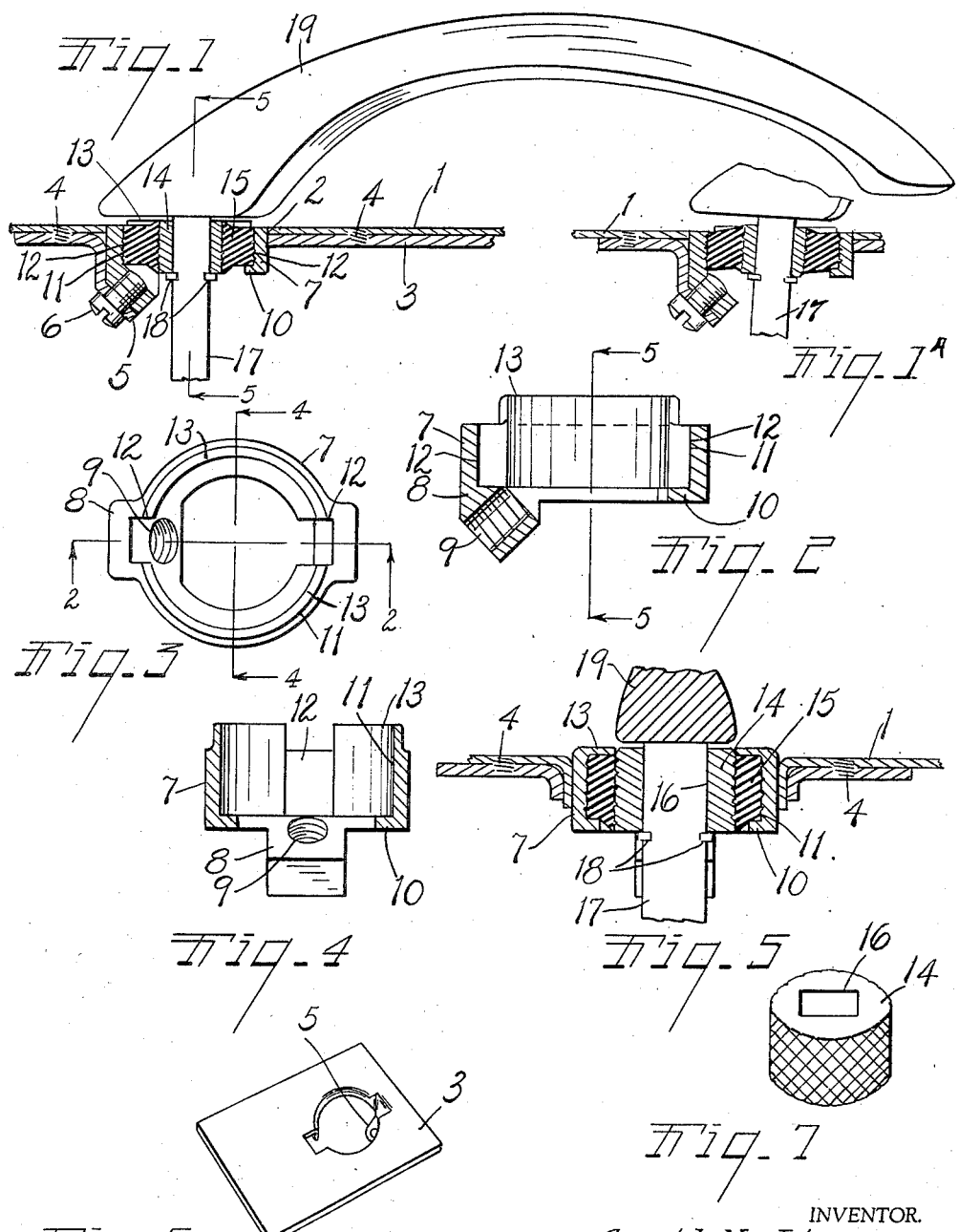

2,227,754

UNITED STATES PATENT OFFICE 2,227,754

DOOR HANDLE

Gerald V. Jakeway, Grand Rapids, Mich., assignor to Keeler Brass Company, Grand Rapids, Mich., a corporation of Michigan Application January 6, 1940, Serial No. 312,727

9 Claims. (Cl. 292—350)

This invention relates to improvements in door handles.

The main objects of this invention are:

First, to provide an improved door handle particularly for automobiles and the like, which is of a simplified and relatively inexpensive construction.

Second, to provide an escutcheon door handle which is attractive in appearance.

Third, to provide a handle of the type described which may be readily assembled on doors.

Fourth, to provide a handle construction of the type described having novel means for permitting a certain amount of swivel thereof to enable the handle spindle to be alined with a lock or other parts associated therewith.

Fifth, to provide a handle construction of the type described having a resilient connection with the door panel to supplement or, if necessary, replace the action of the lock spring to return the handle to normal position.

Objects relating to details and economies of the invention will appear from the description to follow. The invention is defined in the claims.

A structure embodying the features of the invention is illustrated in the accompanying drawing, wherein:

Fig. 1 is a fragmentary plan view partially in horizontal section illustrating the handle of my invention in operative relation to the panel of an automobile door and illustrating details of construction thereof.

Fig. 1A is a fragmentary view generally similar to Fig. 1, illustrating the operation of the parts in securing one of the foregoing objects.

Fig. 2 is an enlarged detail view in section on line 2—2 of Fig. 3, illustrating the mounting or retainer cup constituting a part of the handle assembly of my invention.

Fig. 3 is a front view of the aforesaid mounting or retainer cup.

Fig. 4 is a view in section on line 4—4 of Fig. 3, still further illustrating the cup construction.

Fig. 5 is a fragmentary view in section on a line corresponding to line 5—5 of Fig. 1, illustrating the cup and parts associated therewith in their final mounted position.

Fig. 6 is a perspective view illustrating the reinforcing or mounting plate for the handle assembly, which is fixedly secured to the door panel in accordance with my invention.

Fig. 7 is a perspective view illustrating the spindle receiving sleeve constituting a part of the handle assembly.

The present invention relates to a handle assembly of the general type illustrated and described in my Patent No. 2,102,714, dated December 21, 1937, the present improvements being particularly concerned with a distinct simplification of that structure, although further novel means is herein disclosed and claimed for securing swiveling action of the handle parts relative to the door panel so as to enable the handle spindle to be properly alined with a lock or other parts associated therewith. The present construction may be readily mounted on automobile doors during the course of manufacture thereof and, due to certain features of construction to be hereinafter described, eliminates the need for the usual escutcheon or other decorative or concealing means heretofore employed in handles of this type.

Referring to the drawing, the reference numeral 1 indicates the sheet metal panel of the door of, for example, an automobile, which is apertured at 2 to receive the assembly of my invention to be described.

This assembly includes a reinforcing and mounting plate 3 which is welded to the panel at 4 and is provided with an inwardly offset angled portion or wing 5 to receive a securing screw 6. This screw threadedly coacts with a mounting member 7 which is illustrated in detail in Figs. 2, 3, and 4, being in the form of a die cast cup having a boss 8 provided with an aperture 9 which is threaded or tapped to receive the screw 6. The member 7 is provided with an inwardly turned bottom flange 10 at the lower edge of a generally cylindrical recess 11 therein.

Further lateral recesses 12 communicate with this recess 11 at diametrically opposite points thereof for a purpose to be described. The member 7 terminates at its upper edge in a pair of spaced, deformable arcuate wings 13 of less thickness than the thickness of the side walls of the member, which are adapted to be bent in a manner and for a purpose to be described.

A cylindrical sleeve 14 is mounted concentrically within the member 7 and secured thereto by a rubber insert 15 which is bonded by molding and vulcanizing to the exterior wall of the sleeve and the interior wall of the member 7. The exterior of the sleeve 14 is preferably knurled or otherwise roughened to enhance the strength of the bond. The rubber extends into the lateral recesses 12 to further prevent rotative movement of the cushion in the cylindrical recess 11 of the member 7.

To complete the sleeve and mounting member assembly, the bendable wings 13 are deformed inwardly over the upper edge of the rubber cushion 15, thereby confining the same axially.

The sleeve 14 has a square, axially disposed opening therethrough and the handle spindle or chill 17, which is of cross sectional area corresponding to the opening 16, is inserted in this aperture and offset or winged-over at 18 to prevent relative axial movement of the spindle and sleeve 14. The handle 19 is secured to the free end of the spindle closely adjacent the sleeve 14, being of such width at that point that the rubber insert 15 is concealed from view, as well as all portions of the mounting means other than the inwardly displaced tabs 13 which contribute an ornamental and pleasing appearance.

By the foregoing construction, I provide a handle which is extremely simple in its parts and very readily mounted on the door panel. The resilient cushion or insert 15 enables the spindle 17 to pivot or swivel sufficiently to permit its ready alinement with a lock or other parts to be associated therewith. At the same time, the resilient connection between the spindle and door which is thus provided supplements or assists the resilient action of the lock spring and, if necessary, may replace the same. It should be clearly understood that this insert or cushion 15 is firmly bonded to both the sleeve 14 and cup 7 so that relative movement of these two parts, other than that permitted by the resiliency of the rubber, is absent.

The construction which I have shown and described permits the center line of the spindle or shank 17 to be at a distinct angle to the door panel, which is frequently necessary in order to make the center line of the spindle come perpendicular to the face of the lock or other mechanism (not shown) coacting on the inner side of the panel. This feature is illustrated in Fig. 1A, wherein the spindle 17 is shown canted at a distinct angle to a line normal to the panel 1, the rubber insert or cushion 15 enabling this action. This saves the panel manufacturer the necessity of stamping offsets in the panel or making other provision to make possible the aforesaid perpendicularity of the spindle to the lock.

The foregoing construction is extremely inexpensive, simple to install and efficient in its action. It permits the handle to be mounted very close to the door which, along with the elimination of the usual escutcheon, results in a very attractive, simplified, and streamlined appearance.

I have illustrated and described my improvements in an embodiment which is very practical. I have not attempted to illustrate or describe other embodiments or adaptations as it is believed this disclosure will enable those skilled in the art to embody or adapt my improvements as may be desired.

Having thus described my invention, what I claim as new and desire to secure by Letters Patent, is:

1. In a mounting for a handle, the combination of a cup-like mounting member, means for securing said mounting member to a door panel in an aperture in the panel adapted to receive the same, a spindle sleeve disposed concentrically of said mounting member, an annular rubber insert molded and vulcanized to said sleeve and mounting member, and a handle spindle non-rotatably received by said sleeve and fixedly secured thereto, said handle overhanging and concealing said sleeve, said rubber member permitting swiveling movement of the spindle to facilitate alignment thereof with a lock or other part to be associated therewith and assisting in return of the handle to normal position following the actuation thereof.

2. In a mounting for a handle, the combination of a cup-like mounting member, means for securing said mounting member to a door panel in an aperture in the panel adapted to receive the same, a spindle sleeve disposed concentrically within said mounting member and resiliently secured thereto, and a handle spindle non-rotatably received by said sleeve and fixedly secured thereto, said handle overhanging and concealing said sleeve, the resilient securement of the sleeve to the mounting member permitting swiveling movement of the spindle to facilitate alignment thereof with a lock or other part to be associated therewith and assisting in return of the handle to normal position by rotation of the spindle about its axis following the actuation thereof.

3. In a handle assembly, the combination of an apertured mounting plate defining an assembly receiving opening having an inwardly offset portion, an annular mounting member disposed within said opening and having a portion inclined to the axis thereof, a screw engageable with said inclined portion and arranged through said inwardly offset portion of said mounting plate for securing said mounting member with its outer end flush with the panel on which the mounting plate is mounted, a spindle sleeve disposed concentrically within said mounting member, an annular rubber insert surrounding said sleeve and molded and vulcanized thereto and to said mounting member to maintain the sleeve in position relative to the latter while permitting relative angular movement of the sleeve, and a spindle disposed through and non-rotatably secured to said sleeve, said spindle being provided with a handle fixedly secured thereto and having a portion lying closely adjacent to said sleeve and mounting member to conceal the sleeve and at least partially conceal the mounting member.

4. In a handle assembly, the combination of an apertured mounting plate defining an assembly receiving opening having an inwardly offset portion, an annular mounting member disposed within said opening and having a portion inclined to the axis thereof, a screw engageable with said inclined portion and arranged through said inwardly offset portion of said mounting plate for securing said mounting member with its outer end flush with the panel on which the mounting plate is mounted, a spindle sleeve disposed concentrically within said mounting member, an annular rubber insert surrounding said sleeve and molded and vulcanized thereto and to said mounting member to maintain the sleeve in position relative to the latter while permitting relative angular movement of the sleeve, and a spindle disposed through and non-rotatably secured to said sleeve.

5. In a handle assembly, the combination of an apertured mounting plate defining an assembly receiving opening, an annular mounting member disposed within said opening and secured to said plate, a spindle sleeve disposed concentrically of said mounting member, an annular rubber insert surrounding said sleeve and fixedly secured thereto and to said mounting member to maintain the sleeve in position relative to the latter while permitting relative angular movement of the sleeve member, and a spindle disposed through and non-rotatably secured in said sleeve, said spindle being provided with a handle fixedly secured thereto and having a portion lying closely adjacent to said sleeve and mounting member to conceal the sleeve and at least partially conceal the mounting member, said insert yielding to permit rotation of the sleeve and spindle about the axis thereof and resiliently rotatively returning the same about said axis when the handle is released.

6. A handle assembly for mounting a handle on automobile doors and the like, comprising a mounting plate adapted to be fixedly secured to the panel of a door adjacent an opening in the panel to receive the assembly, an annular cup-like mounting member disposed in said opening, a screw engageable with said mounting plate and threadedly engaging said member to maintain the latter in fixed relation to the panel in position approximately flush with the surface of the latter, a sleeve disposed within said mounting member, an annular resilient insert disposed between and secured to said sleeve and member whereby to maintain the former in position relative to the latter while permitting relative angular movement thereof, and a spindle non-rotatively secured to said sleeve, said spindle having an operating handle fixedly secured thereto, said handle having a portion lying closely adjacent said sleeve and member to conceal the sleeve.

7. A handle assembly for automobile doors and the like, comprising a mounting plate adapted to be fixedly secured to the panel of a door adjacent an opening in the panel to receive the assembly, an annular cup-like mounting member disposed in said opening, a screw engageable with said mounting plate and threadedly engaging said member to maintain the latter in fixed relation to the panel, a sleeve disposed within said mounting member, an annular resilient insert disposed between and secured to said sleeve and member whereby to maintain the former in position relative to the latter while permitting relative angular movement thereof, and a spindle non-rotatively secured to said sleeve, said spindle having an operating handle fixedly secured thereto, said resilient insert rendering said spindle capable of angular canting movement with reference to the plane of the panel for associating the spindle with other parts coacting therewith, and yielding to permit rotation of the sleeve and spindle about the axis thereof.

8. A handle assembly for door panels and the like, comprising a mounting member, means for fixedly securing said member to a door panel, a sleeve element disposed in operative concentric relation to said member, a resilient insert between said member and element maintaining the same in operative relation while permitting relative angular movement thereof, said insert being secured to the member and element, a spindle non-rotatably received by said element, said spindle having an actuating handle fixedly secured thereto and concealing said member and element at least in part, said resilient mounting for the spindle and element permitting swiveling of the spindle to facilitate alignment thereof with a lock or other part to be associated therewith and assisting in return of the handle to normal position by rotation of the spindle about its axis following actuation thereof.

9. A handle assembly for door panels and the like, comprising a mounting member, means for fixedly securing said member to a door panel, a sleeve element disposed in operative concentric relation to said member, a resilient insert between said member and element maintaining the same in operative relation while permitting relative angular movement thereof, said insert being secured to the member and element, a spindle non-rotatably received by said element, said spindle having an actuating handle fixedly secured thereto, said resilient mounting for the spindle and element assisting in return of the handle to normal position by rotation of the spindle about its axis following actuation thereof and rendering the spindle tiltable with reference to its center line for facilitating engagement thereof with parts coacting therewith.

GERALD V. JAKEWAY.